(12) United States Patent
Friedman

(10) Patent No.: US 10,021,863 B2
(45) Date of Patent: Jul. 17, 2018

(54) FISHING LURE WITH MULTIPLE PRESET SPEED SETTINGS

(71) Applicant: Bryan Friedman, Chino, CA (US)

(72) Inventor: Bryan Friedman, Chino, CA (US)

( * ) Notice: Subject to any disclaimer, the term of this patent is extended or adjusted under 35 U.S.C. 154(b) by 108 days.

(21) Appl. No.: 14/612,862

(22) Filed: Feb. 3, 2015

(65) Prior Publication Data

US 2016/0219852 A1 Aug. 4, 2016

(51) Int. Cl.
| | | |
|---|---|---|
| *A01K 85/00* | (2006.01) | |
| *A01K 85/01* | (2006.01) | |
| *A01K 97/00* | (2006.01) | |

(52) U.S. Cl.
CPC .............. *A01K 85/00* (2013.01); *A01K 85/01* (2013.01); *A01K 97/00* (2013.01)

(58) Field of Classification Search
CPC ......... A01K 85/00; A01K 85/01; A01K 85/16
USPC ............... 43/17.6, 26.2, 42.22, 42.45, 42.53
See application file for complete search history.

(56) References Cited

U.S. PATENT DOCUMENTS

| | | | | |
|---|---|---|---|---|
| 1,993,798 A | | 3/1935 | Peterson | |
| 2,817,920 A | * | 12/1957 | Mitchell | ............... A01K 85/16 43/17.6 |
| 2,955,375 A | | 10/1960 | Mitchell | |
| 3,085,361 A | | 4/1963 | Rhodes | |
| 3,483,651 A | | 12/1969 | Borger | |
| 3,505,754 A | * | 4/1970 | Lawlor | .................. A01K 85/16 43/42.22 |
| 4,155,192 A | | 5/1979 | Varaney | |
| 4,161,077 A | * | 7/1979 | Ciaccio | ................... A01K 91/02 43/26.1 |
| 4,257,182 A | * | 3/1981 | Thom | ..................... A01K 85/16 43/42.06 |
| 4,536,985 A | * | 8/1985 | Caviness | ................ A01K 85/16 43/17.6 |
| 4,757,633 A | * | 7/1988 | Van Cleve | ............. A01K 91/02 43/26.1 |
| 5,134,799 A | | 8/1992 | Trnka | |
| 5,329,721 A | | 7/1994 | Smith | |
| 5,566,498 A | | 10/1996 | Itoh | |

(Continued)

FOREIGN PATENT DOCUMENTS

WO    WO 91/11235    8/1991

OTHER PUBLICATIONS

Koichi Hirata, et al, "Study on Turning Performance of a Fish Robot", Proc. of 1st Int. Sym. on Aqua Bio-Mechanisms, pp. 287-292, 2000, Japan.

*Primary Examiner* — David J Parsley
(74) *Attorney, Agent, or Firm* — Roeder & Broder LLP; James P. Broder

(57) ABSTRACT

A fishing lure for use in water includes a lure body, a mover assembly and a selector assembly. The mover assembly is coupled to the lure body. The mover assembly includes a mover that selectively moves the lure body through the water. The selector assembly is electrically connected to the mover assembly. The selector assembly includes a plurality of preset speed settings that activate the mover assembly to move the lure body through the water. The plurality of preset speed settings can include (i) a first preset speed setting for moving the mover at a first preset speed, and (ii) a second preset speed setting for moving the mover at a second preset speed that is different than the first preset speed.

20 Claims, 3 Drawing Sheets

(56) References Cited

U.S. PATENT DOCUMENTS

| | | | |
|---|---|---|---|
| 5,581,930 A * | 12/1996 | Langer | A01K 79/02 |
| | | | 43/17 |
| 5,694,714 A | 12/1997 | Basso et al. | |
| 5,740,750 A | 4/1998 | Triantafyllou et al. | |
| 5,992,084 A | 11/1999 | Kitagawa | |
| 6,089,178 A | 7/2000 | Yamamoto et al. | |
| 6,179,683 B1 | 1/2001 | Pell et al. | |
| 6,389,732 B1 * | 5/2002 | Daniel | A01K 91/02 |
| | | | 43/26.1 |
| 6,581,319 B2 | 6/2003 | West | |
| 6,609,326 B2 | 8/2003 | Salonen et al. | |
| 6,622,419 B2 | 9/2003 | Pearce | |
| 6,718,684 B2 | 4/2004 | Yong-Set et al. | |
| 6,760,995 B2 * | 7/2004 | Mueller | A01K 91/02 |
| | | | 43/26.2 |
| 6,860,785 B2 | 3/2005 | Vap | |
| 7,028,430 B2 | 4/2006 | Gironda | |
| 7,310,905 B2 | 12/2007 | Merline | |
| 7,347,759 B2 | 3/2008 | Williams, Sr. et al. | |
| 7,712,245 B1 | 5/2010 | Jarboe | |
| 7,886,478 B1 * | 2/2011 | Byrd | A01K 97/00 |
| | | | 242/225 |
| 8,316,576 B1 | 11/2012 | Brown | |
| 8,621,776 B2 | 1/2014 | Thomas | |
| 2007/0107295 A1 | 5/2007 | Kaptis | |
| 2010/0293832 A1 | 11/2010 | Woodcock | |
| 2011/0252689 A1 | 10/2011 | Abraham et al. | |
| 2013/0067792 A1 * | 3/2013 | Thomas | A01K 85/00 |
| | | | 43/26.2 |
| 2014/0115944 A1 | 5/2014 | Thomas | |

\* cited by examiner

FISHING LURE WITH MULTIPLE PRESET SPEED SETTINGS

BACKGROUND

Recreational fishing, or sport fishing, is growing in popularity in many areas. Many people go fishing for pleasure, as part of a competition or just to relax. Recreational fishing most often includes use of a fishing rod, a fishing line and one or more hooks that can be positioned at or near the end of the fishing line. Although live bait (or dead bait) can be and is still often utilized by recreational fishermen, a fishing lure is commonly used in place of bait, with the one or more hooks being positioned on the body of the fishing lure. A fishing lure is often formed in the shape of various types of fish or other creatures that can be utilized as a means to attract the type of fish that are being sought by the fishermen.

Although the fishermen can manually move the fishing lure through a body of water, e.g., by reeling in the fishing line, more recently fishing lures have been created that include a motor for purposes of moving the fishing lure through the water to simulate movement of the fish or other creature in order to attract the type of fish being sought. Unfortunately, such fishing lures often lack sufficient variable functionality, can be overly complex to manufacture and/or extremely cumbersome and confusing to operate. Thus, it is desired to provide a fishing lure that is relatively simple to manufacture and operate, and that also provides sufficient functionality to effectively attract the type of fish being sought so that the recreational fishermen can have a more enjoyable overall fishing experience.

SUMMARY

The present invention is directed toward a fishing lure for use in water. In various embodiments, the fishing lure includes a lure body, a mover assembly and a selector assembly. The mover assembly is coupled to the lure body. The mover assembly includes a mover that is configured to move the lure body through the water. The selector assembly is electrically connected to the mover assembly. The selector assembly includes a plurality of preset speed settings that activate the mover assembly to move the lure body through the water. In certain embodiments, the plurality of preset speed settings includes (i) a first preset speed setting for moving the mover at a first preset speed, and (ii) a second preset speed setting for moving the mover at a second preset speed that is different than the first preset speed.

With the design of the fishing lure illustrated and described herein, the fishing lure is relatively simple to manufacture and operate, while still providing sufficiently advanced functionality. Thus, with such design, the user of the fishing lure is able to have a much more enjoyable and positive overall fishing experience.

The selector assembly can have any suitable design. In some embodiments, the selector assembly includes a selector member that is coupled to the lure body. For example, in one such embodiment, the selector assembly includes a first button and a second button that are each coupled to the lure body. In such embodiment, the first button corresponds to the first preset speed setting such that depressing the first button activates the first preset speed setting. Similarly, the second button corresponds to the second preset speed setting such that depressing the second button activates the second preset speed setting. Additionally and/or alternatively, the selector assembly can include a single button that is coupled to the lure body. In such embodiment, depressing the button a first time can activate the first preset speed setting, and depressing the button a second time can activate the second preset speed setting. Still alternatively, in another non-exclusive embodiment, the selector assembly includes a dial that is coupled to the lure body. In such embodiment, the dial can be turned to discrete positions to selectively activate the first preset speed setting and the second preset speed setting. In yet another non-exclusive embodiment, the selector assembly can include a selector member and a slot. In such embodiment, the selector member can be moved to discrete positions within the slot to selectively activate the first preset speed setting and the second preset speed setting.

Still further, in one embodiment, the selector assembly is voice-activated to selectively activate the first preset speed setting and the second preset speed setting.

In certain embodiments, the fishing lure further comprises a sealable compartment that is positioned substantially within the lure body. During use of the fishing lure, the sealable compartment can be selectively filled with a weighting material for selectively adjusting a depth at which the lure body can be positioned within the water. In some such embodiments, the weighting material is a fluid, i.e. a liquid or a gas. Further, in some embodiments, a scented material can be used within the sealable compartment that is designed to attract the desired fish for the user.

Additionally, in some embodiments, the plurality of preset speed settings can further include a third preset speed setting for moving the mover at a third preset speed that is different than the first preset speed and the second preset speed.

Further, in certain embodiments, the plurality of preset speed settings can also include a "random" speed setting, where the mover moves at varying and/or random speeds that are not specifically or precisely controlled by the user.

In another non-exclusive embodiment, the present invention is further directed toward a method for manufacturing a fishing lure for use in water. In one embodiment, the method includes the steps of (A) coupling a mover assembly to a lure body, the mover assembly including a mover that is configured to move the lure body through the water; and (B) electrically connecting a selector assembly to the mover assembly, the selector assembly including a plurality of preset speed settings that activate the mover assembly to move the lure body through the water, the plurality of preset speed settings including (i) a first preset speed setting for moving the mover at a first preset speed, and (ii) a second preset speed setting for moving the mover at a second preset speed that is different than the first preset speed.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
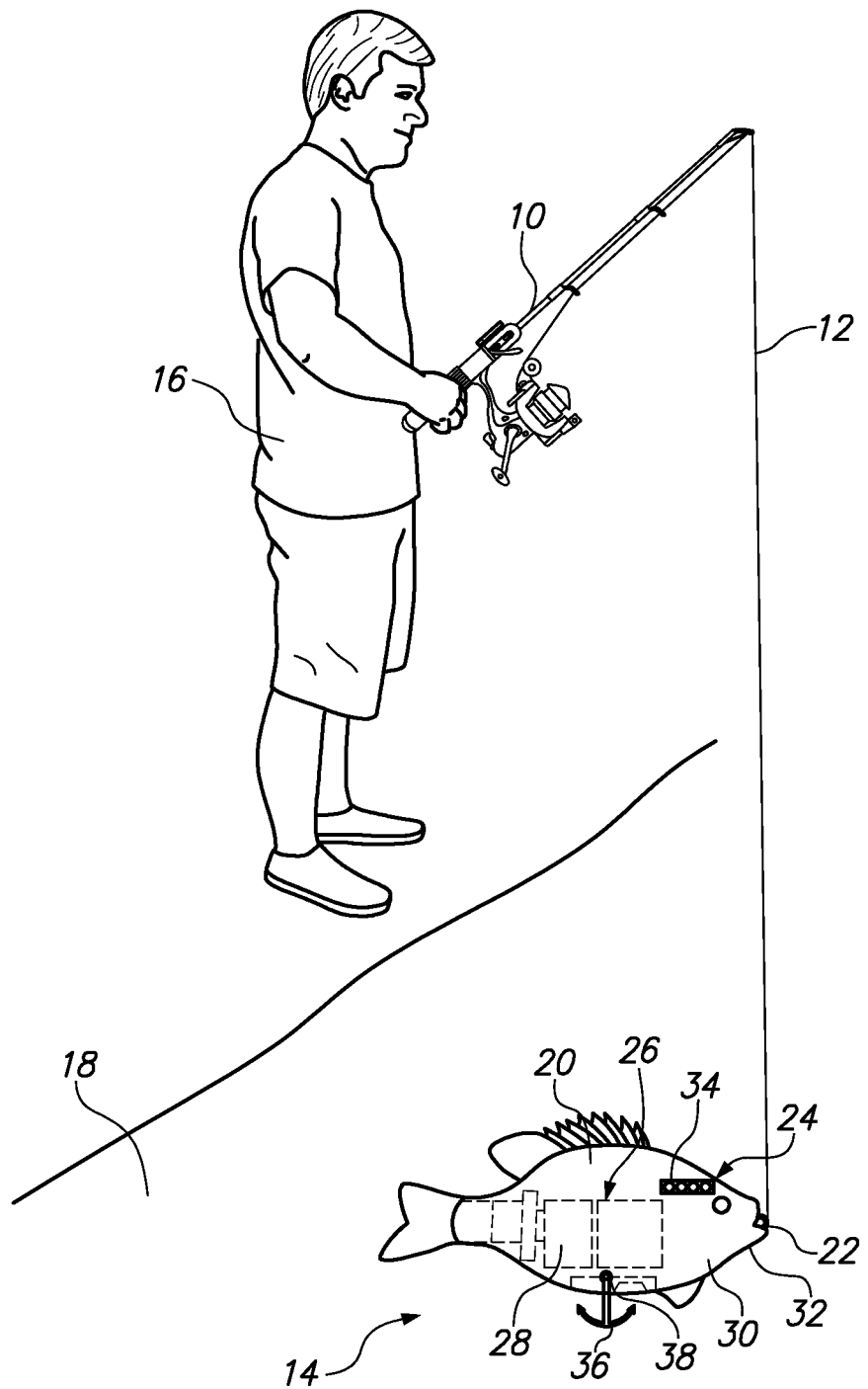
FIG. 1 is a simplified schematic view of a fishing rod with a fishing line, and a fishing lure having features of the present invention that is coupled to the fishing line, a portion of the fishing lure being illustrated in phantom.

FIG. 1 is a simplified schematic view of a fishing rod 10 with a fishing line 12 extending therefrom, and a fishing lure 14 having features of the present invention that is removably coupled to the fishing line 12. The fishing rod 10 and the fishing line 12 can have any suitable design. Additionally, as shown, the fishing rod 10 can be held by a fisherman 16, (also sometimes referred to herein as a "user"), for purposes of utilizing the fishing lure 14 to attract and catch fish (not shown) in a body of water 18.

It should be appreciated that the present invention can be utilized in any suitable body of water 18, and the water 18 can have a natural current or flow (which may be variable) or can be substantially still, i.e. substantially devoid of a natural current.

Additionally, it should further be appreciated that the drawings included herewith are not necessarily drawn to scale. For example, in FIG. 1, the size of the fishing lure 14 is not necessarily to scale with the size of the fisherman 16, with the fishing lure 14 being drawn somewhat larger than scale for purposes of clarity in demonstrating certain features and limitations of the fishing lure 14.

Further, it should also be appreciated that although the present invention is described in detail herein as a fishing lure, the features and aspects of the present invention can be utilized for other purposes as well. For example, the features and aspects of the fishing lure 14 described herein are such that the present invention can be utilized as a swimming toy and/or a bathtub toy, with no need to couple the device to a fishing line 12 and/or a fishing rod 10.

The design of the fishing lure 14 can be varied as desired. In certain embodiments, as illustrated, the fishing lure 14 is comprised of a lure body 20, a line coupler 22 that is secured to, formed within, and/or coupled to the lure body 20, and a selector assembly 24 that is coupled to the lure body 20. Alternatively, the fishing lure 14 can be configured such that at least a portion of the selector assembly 24 is positioned spaced apart from the lure body 20.

As an overview, the fishing lure 14 is configured to enable the user 16 to selectively activate a plurality (however, a finite number) of preset speed settings for moving the lure body 14 through the water 18. More particularly, the selector assembly 24 is electrically connected to a mover assembly 26 (illustrated in phantom in FIG. 1). With this design, the user 16 can selectively activate the plurality of preset speed settings for moving a mover 28 (illustrated in phantom) of the mover assembly 26 at a plurality of discrete, alternate, preset speeds. In certain embodiments, the selector assembly 24 can include at least (i) a first preset speed setting for moving the mover 28 at a first preset speed, and (ii) a second preset speed setting for moving the mover 28 at a second preset speed that is different than the first preset speed. Additionally, in some such embodiments, the selector assembly 24 can further include a third preset speed setting for moving the mover 28 at a third preset speed that is different than the first and second preset speeds. Further and/or alternatively, in certain non-exclusive embodiments, the selector assembly 24 can include a greater number of preset speed settings for moving the mover 28 at still other preset speed settings. As utilized herein, the reference to various, alternative preset speed settings for moving the mover 28 at alternative preset speeds is intended to encompass only non-zero speed settings that actively move the mover 28 at the plurality of discrete, alternative preset speeds.

Additionally, it is understood that the alternative preset speed settings can have any suitable or desired preset values. For example, each of the first, second and third preset speed settings can have any suitable or desired cycles per second (Hertz) for the mover 28. Further, it is recognized that the alternative preset speed settings can be referred to with any suitable or desired labels. For example, in some embodiments which include three discrete, alternative preset speed settings, the preset speed settings can be labeled generally as "slow", "medium" and "fast"; as "low", "medium" and "high"; as "A", "B" and "C"; and/or as "1", "2" and "3". Alternatively, the preset speed settings can have any other suitable hierarchical label.

Still alternatively, in some embodiments, the selector assembly 24 can further include a "random" speed setting that can be optionally selected by the user 16 from the various choices of preset speed settings. With such design, selecting of the random speed setting enables the mover 28 and/or the fishing lure 14 to move at random and/or varying speeds that are not under the precise control of the user 16. Such a setting can better enable the user 16 to attract the desired fish in certain fishing conditions. Additionally, such a setting can also provide greater enjoyment for the user 16 in certain situations, e.g., when the fishing lure 14 is being used as a swimming toy and/or a bathtub toy, as opposed to being used as a fishing lure.

Still further, in some embodiments, as illustrated herein, the selector assembly 24 can also include a non-moving speed setting, i.e. a zero or "off" setting, at which the mover 28 is stationary and/or is not moved for purposes of moving the lure body 14 through the water 18.

The lure body 20 can have any suitable design depending on the intended use of the fishing lure 14. For example, in various embodiments, the lure body 20 can have the general shape of any variety of fish that is capable of attracting the type of fish that the user 16 is trying to catch. Additionally and/or alternatively, in other embodiments, the lure body 20 can have the general shape of a worm, a frog, a crayfish, an insect, or another type of creature or inanimate object that is capable of attracting the type of fish that the user 16 is trying to catch.

It should be appreciated that the embodiments of the fishing lure 14 described in detail herein enable the realization of one or more certain advantages over previously available fishing lures. For example, with the various designs illustrated and described herein, the fishing lure 14 can be relatively simple to manufacture and operate, while still enabling the fishing lure 14 to effectively simulate the movement of the fish or other creature or object for purposes of attracting the type of fish that the user 16 is trying to catch. More specifically, with the design illustrated and described herein, prior to each cast, the user 16 can quickly and easily adjust the speed of the mover 28, and thus can better control the speed of the fishing lure 14 moving through the water 18 as desired.

It should be appreciated that it may be desirable to adjust the speed of the mover 28 and/or the fishing lure 14 for various reasons. For example, in cold water, many fish are lethargic and will only bite a slow or non-moving fishing lure. Conversely, in warm water, many fish are more active and will only bite a fast or sporadic moving fishing lure. Additionally, in murky water, the fishing lure 14 may need to be moved slowly so as to better enable the fish to actually find the fishing lure 14. Further, when fish are in a "reaction bite", the fish may only bite sporadic fishing lures because genetics tell them only to kill, and not to bite because they are hungry.

As noted above, in various embodiments, the line coupler 22 can be secured to, formed within, and/or coupled to the lure body 20. The line coupler 22 can have any suitable design depending on the specific requirements of the fishing lure 14. For example, in one such embodiment, the line coupler 22 can include an eyelet or ring that is coupled to an external surface 30 of the lure body 20, e.g., near a body front 32 or nose of the lure body 20. Alternatively, in another such embodiment, the line coupler 22 can include an aperture that is formed into the external surface 30 of the lure body 20, e.g., near the body front 32 or nose of the lure body 20. Still alternatively, the line coupler 22 can have another suitable design such that the line coupler 22 can be coupled to the lure body 20 in a different manner and/or at a different position on the lure body 20. Yet alternatively, in some embodiments, the fishing lure 14 can be designed without the line coupler 22. For example, in one such alternative embodiment, a hole can be provided fully through the lure body 20, e.g., from the top of the head through the bottom jaw, and the fishing line 12 can be directly tied to a hook 36 that is coupled to the lure body 20 without the need for the line coupler 22.

Additionally, as noted above, the selector assembly 24 can be secured to or coupled directly or indirectly to the lure body 20. For example, in certain embodiments, the selector assembly 24 can be coupled to the external surface 30 of the lure body 20 to enable the user 16 to have easy access to the selector assembly 24 for purposes of selectively activating any of the plurality of preset speed settings. With this design, for example, the user 16 can more quickly and easily adjust the speed of the fishing lure 14 as desired before and/or after each cast of the fishing line 12, and thus the fishing lure 14, into the water 18. Alternatively, in other embodiments, the selector assembly 24 can be coupled to a different portion of the lure body 20. Still alternatively, as noted above, in still other embodiments, at least a portion of the selector assembly 24 can be positioned remotely from, i.e. spaced apart from, the lure body 20.

As discussed in greater detail herein below, the selector assembly 24 can have any suitable design so as to effectively enable the user 16 to selectively activate any of the plurality of preset speed settings. In certain non-exclusive embodiments, the selector assembly 24 can include a selector member 34 (also sometimes referred to herein generally as a "selector") that is physically and/or mechanically connected or coupled to the lure body 20. The selector member 34 can be configured to specifically provide the user 16 with the means to selectively activate each of the preset speed settings for the mover 28. For example, in some such embodiments, the selector 34 of the selector assembly 24 can include: (i) a plurality of buttons, with each button corresponding to one of the preset speed settings such that alternatingly depressing each of the buttons selectively activates one of the plurality of preset speed settings; (ii) a single button, wherein each of the plurality of preset speed settings can be selectively activated depending on the number of times the user 16 depresses the button; (iii) a dial that can be alternatingly moved or turned to each of a plurality of discrete, finite positions, with each discrete position corresponding to one of the plurality of preset speed settings; and/or (iv) a shaft that can be selectively moved to a plurality of discrete positions within a slot to enable the user 16 to selectively activate each of the plurality of preset speed settings. Alternatively, the selector 34 and/or the selector assembly 24 can have any other suitable design that effectively enables the user 16 to selectively activate each of the plurality of discrete, alternate preset speed settings.

Still alternatively, in other embodiments, the selector 34 can be positioned remotely from (or spaced apart from) the lure body 20. For example, in non-exclusive alternative embodiments, the selector 34 can include (i) a voice-activated system, e.g., a handheld voice-activated system, wherein a voice-activation receiver can be coupled to the lure body 20 such that the user 16 can selectively activate each of the plurality of preset speed settings through the use of voice commands; and/or (Ii) a remote control or mobile phone app, wherein a signal receiver can be coupled to the lure body 20 such that the user 16 can selectively activate each of the plurality of preset speed settings through use of the remote control, the mobile phone app, or the like.

Additionally, as shown in FIG. 1, the fishing lure 14 can also include one or more hooks 36 (one is illustrated in FIG. 1) that are coupled to the lure body 20 via a hook coupler 38, e.g., a ring or eyelet or hook aperture, that is secured to, formed within and/or coupled to the lure body 20.

Figure 2:
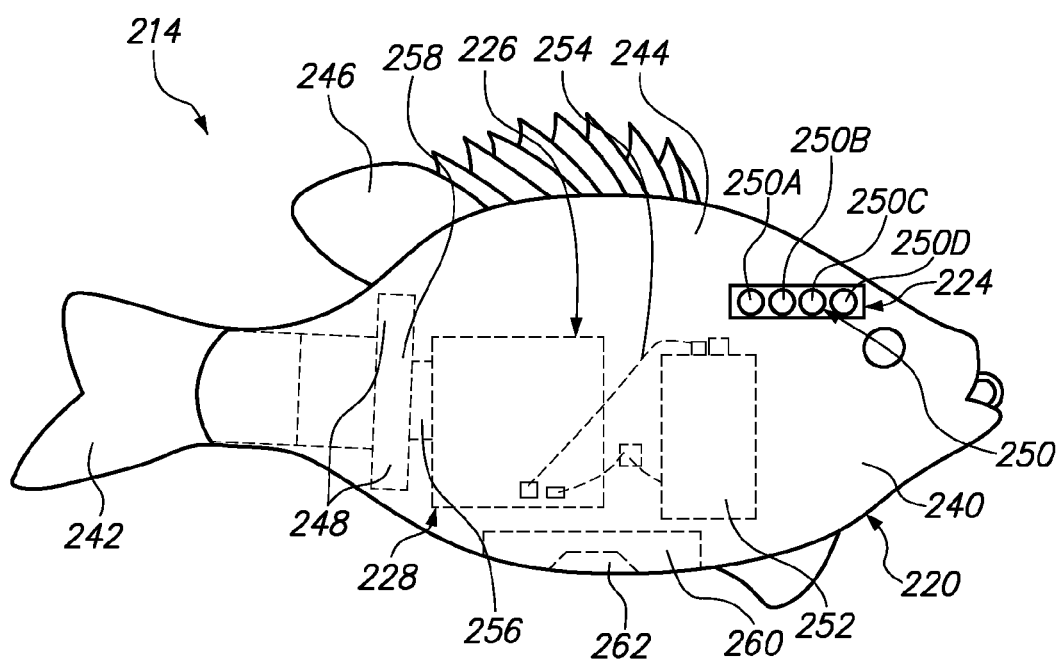
FIG. 2 is a schematic side view of an embodiment of the fishing lure illustrated in FIG. 1, with a portion of the fishing lure illustrated in phantom.

FIG. 2 is a schematic side view of an embodiment of the fishing lure 214 illustrated in FIG. 1, with a portion of the fishing lure 214 being illustrated in phantom. The design of the fishing lure 214 can be varied as desired. In various embodiments, the fishing lure 214 can include a lure body 220, a selector assembly 224 and a mover assembly 226 (illustrated in phantom) including a mover 228 (illustrated in phantom). It is appreciated that certain features, e.g., the hook coupler 38 and the hook 36, are omitted from FIG. 2A for purposes of clarity and ease of understanding.

The lure body 220 can have any desired size and shape depending on the intended use of the fishing lure 214 and the types of fish that the user 16 (illustrated in FIG. 1) is trying to attract and catch. Additionally, as illustrated, in certain embodiments, the lure body 220 includes a main body section 240 and a tail section 242 that is movably coupled to the main body section 240. For example, the lure body 220 can further include a hinge (not shown) for movably coupling the tail section 242 to the main body section 240.

The main body section 240 includes a cavity 244 or chamber within which various other components, e.g., the various components of the mover assembly 226, can be housed or otherwise contained. For example, in various embodiments, the cavity 244 can be at least substantially water-resistant, waterproof or watertight in order to protect the components that are positioned within the cavity 244. In alternative embodiments, the main body section 240 can be formed as a unitary, one-piece body section, or the main body section 240 can be formed from more than one piece, e.g., two pieces or halves, that are selectively coupled together.

Additionally, the main body section 240 can be formed from any suitable materials. For example, in some non-exclusive alternative embodiments, the main body section 240 can be formed from one or more of plastic, rubber, wood, metal, various composite materials, epoxy, or any other suitable material.

As noted above, in various embodiments, the lure body 220 includes the tail section 242 that is movably coupled to the main body section 240. In such embodiments, the tail section 242 can be selectively moved relative to the main body section 240, i.e. through selective activation of the mover assembly 226 and/or the mover 228 through use or manipulation of the selector assembly 224, to move the fishing lure 214 through the water 18 (illustrated in FIG. 1) at a desired speed relative to any water current.

In embodiments such as illustrated in FIG. 2, the tail section 242 can be coupled to the main body section 240 in any suitable manner provided that the tail section 242 is able to move relative to the main body section 240, e.g., in a back-and-forth manner, to move or propel the fishing lure 214 through the water 18. For example, in some such embodiments, the tail section 242 can include one or more coupling members 248 that can be selectively and movably coupled to the main body section 240, e.g., within the cavity 244 formed within the main body section 240.

Further, the tail section 242 can be formed from any suitable materials. For example, in certain non-exclusive, alternative embodiments, the tail section 242 can be formed from one or more of plastic, rubber, wood, metal, various composite materials, or any other suitable material.

Additionally and/or alternatively, the lure body 220 can further include one or more fins 246 that are coupled to the main body section 240. In certain embodiments, the fins 246 can be movably coupled to the main body section 240 in lieu of or in addition to the tail section 242. In such embodiments, selective activation of the mover assembly 226 and/or the mover 228 through use or manipulation of the selector assembly 224 can move the fins 246 relative to the main body section 240 to move the fishing lure 214 through the water 18 at a desired speed relative to any water current.

As noted above, the selector assembly 224 can be selectively activated by the user 16 to move the mover 228 of the mover assembly 226 at a plurality of discrete, preset speeds for purposes of moving the fishing lure 214 through the water 18. It is understood that the speed of the fishing lure 214 through the water 18 will necessarily depend on any current speed and direction that may exist within the body of water 18, as well as the direction that the fishing lure 214 is facing within the water 18, the temperature of the water 18, the salinity (and other constituents) of the water 18, the topography of the land within the water, and various other factors.

In certain embodiments, the selector assembly 224 can include (i) a first preset speed setting that when selected moves the mover 228 at a discrete, first preset speed; (ii) a second preset speed setting that when selected moves the mover 228 at a discrete, second preset speed that is different than (greater than or less than) the first preset speed; and (iii) a third preset speed setting that when selected moves the mover 228 at a discrete, third preset speed that is different than (greater than or less than) each of the first preset speed and the second preset speed. Additionally, the selector assembly 224 can include a finite number greater than three or less than three discrete preset speed settings, and/or the selector assembly 224 can include a "random" speed setting. Further, the selector assembly 224 can include a non-moving speed, or "off" setting, when it is not desired to move the mover 228 and/or to move the fishing lure 214 through the water 18. In one embodiment, the preset speed settings can be preset by the manufacturer and cannot thereafter be changed (although, as taught herein, the user 16 can choose from among the preset speed settings during use of the fishing lure 214). Alternatively, the preset speed settings can be preset by the manufacturer, and can be changed by the user 16 to accommodate particular specifications of the user 16 depending upon the specific type of fishing to be done.

As discussed herein, the selector assembly 224 can have any suitable design that is able to selectively activate each of the preset speeds for the mover 228. In the embodiment illustrated in FIG. 2, the selector assembly 224 includes a plurality of buttons 250 that can be selectively depressed in order to selectively activate each of the preset speed settings. More particularly, in such embodiment, the selector assembly 224 includes (i) a first button 250A that can be selectively depressed by the user 16 to selectively activate the first preset speed for the mover 228; (ii) a second button 250B that can be selectively depressed by the user 16 to selectively activate the second preset speed for the mover 228; (iii) a third button 250C that can be selectively depressed by the user 16 to selectively activate the third preset speed for the mover 228; and (iv) a fourth button 250D that can be selectively depressed by the user 16 to selectively activate the non-moving or "off" setting for the mover 228. As noted above, it should be readily understood that the selector assembly 224 can include any desired number of preset speed settings, including the possibility of a "random" preset speed setting.

As provided herein, the selector assembly 224 is electrically coupled to the mover assembly 226 for purposes of moving the mover 228 at any of the desired preset speeds, i.e. revolutions per minute (RPM), cycles per second (Hz), or another suitable measure of movement of the mover 228. As illustrated, in certain embodiments, the mover assembly 226 includes a power source 252 and the mover 228.

The power source 252 provides the necessary electrical power for the mover assembly 226 in order to move the mover 228 as desired, i.e. at any and all of the discrete, preset speeds. As illustrated, the power source 252 can be electrically coupled to the mover 228 through one or more wires 254 that extend generally between the power source 252 and the mover 228. Alternatively, the power source 252 can provide the necessary electrical power to the mover 228 in another manner.

Additionally, the power source 252 can have any suitable design. For example, the power source 252 can include one or more batteries, which can be rechargeable batteries or single use batteries. Alternatively, the power source 252 can have another suitable design, e.g., being charged from a wall via a power chord.

As described herein, the mover 228 is configured to selectively move at various discrete speed settings for purposes of moving the lure body 220 through the water 18. The mover 228 can have any suitable design that is able to selectively move the tail section 242 and/or the fins 246 relative to the main body section 240 to selectively move the lure body 220 through the water 18. In certain embodiments, the mover 228 includes a first mover member 256 and a second mover member 258 that engage and/or interact with one another. In some such embodiments, such as illustrated in FIG. 2, the first mover member 256 can be coupled to the main body section 240, and the second mover member 258 can be coupled to the tail section 242. In such embodiments, selective movement of the first mover member 256 can cause selective movement of the second mover member 258, and thus the desired movement of the tail section 242 relative to the main body section 240 for purposes of moving the lure body 220 through the water 18. Stated in another manner, the selective activation of the selector assembly 224 causes the power source 252 to provide sufficient electrical power to selectively move the first mover member 256 at a desired discrete, preset speed; and the first mover member 256 engages and/or interacts with the second mover member 258 to move the second mover member 258 and thus the tail section 242 relative to the main body section 240.

In some embodiments, the mover 228 can be selectively activated through use of the selector assembly 224 to move the tail section 242 in a generally back-and-forth manner relative to the main body section 240. Additionally and/or alternatively, in other embodiments, the mover 228 can be selectively activated through use of the selector assembly 224 to move the tail section 242 in a generally up-and-down manner relative to the main body section 240.

Additionally, FIG. 2 also illustrates that the fishing lure 214 and/or the lure body 220 can further include a sealable compartment 260 that is positioned substantially within the lure body 220. In certain applications, the sealable compartment 260 can be partially or entirely filled with any type of weighting material for selectively adjusting the depth within the water 18 at which the fishing lure 214 is positioned or "swims" during fishing. For example, the sealable compartment 260 can be opened, and any type of weighting material can be inserted or added to the sealable compartment 260 to influence the buoyancy of the fishing lure 214. The more weight that is added, the deeper the fishing lure 214 resides during fishing.

Additionally, the type of weighting material that is used within the sealable compartment 260 can be one or more of a solid or a fluid (liquid or gas). For example, in certain embodiments, a fluid such as water or other liquids can be used. Usable solids can include sand, beads (which can also make audible sounds to attract fish), metals, or any other type of solid material that can fit within the sealable compartment 260. The sealable compartment 260 can also be filled with a gaseous fluid to impact buoyancy.

It should be appreciated that although only one sealable compartment 260 is illustrated in FIG. 2, the fishing lure 214 can include more than one sealable compartment that are usable for similar purposes. Stated in another manner, the fishing lure 214 can include any number or shape of such compartments 260. Further, the compartments 260 can be different sizes or shapes from one another.

The sealable compartment 260 can have any suitable means of sealing the compartment 260 to either retain the weighting material inside the compartment 260, or alternatively, to keep weighting material out of the compartment 260. For instance, in some embodiments, the compartment 260 can be sealed with a removable plug 262 or some other selectively removable sealing device. Still further, it should be understood that the location of the compartment(s) 260 within the fishing lure 214 can be varied to influence the orientation of the fishing lure 214 while in the water 18 during fishing.

Further, in certain embodiments, a scented material, e.g., a scented liquid, can be further used within the sealable compartment 260. The specific scented materials utilized can be chosen by the user 16 depending upon the types of fish that the user 16 is trying to attract. In such embodiments, during use of the fishing lure 214 with the scented material, it can be desirable to use the sealable compartment 260 without the removable plug 262 so as to allow the scented material to be slowly released into the water 18 as the fishing lure 214 moves through the water.

Figure 3A:
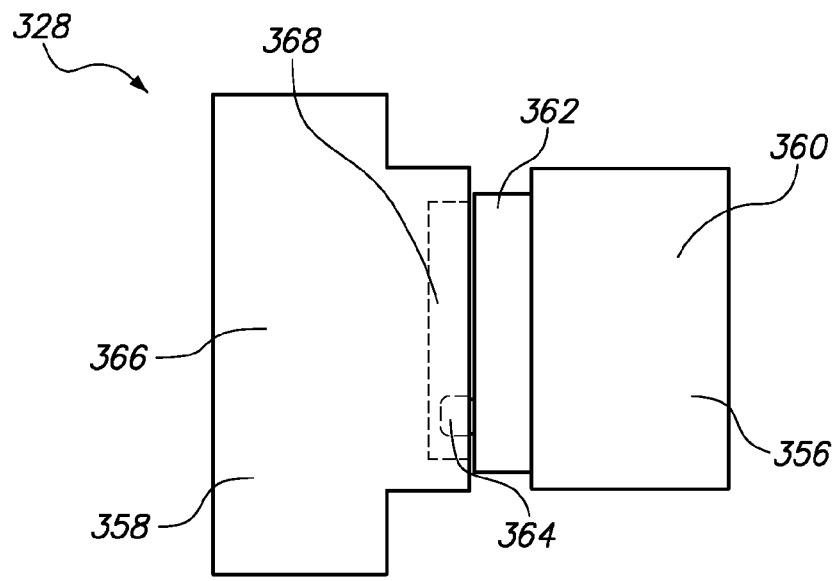
FIG. 3A is a perspective view of an embodiment of a mover that is usable as part of the fishing lure illustrated in FIG. 2.
Figure 3B:
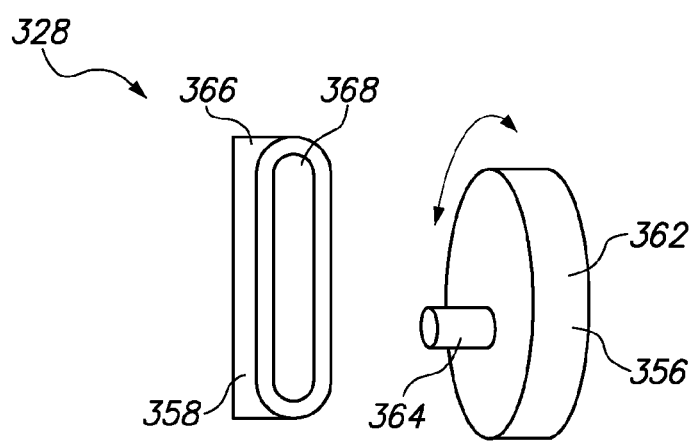
FIG. 3B is an exploded perspective view of a portion of the mover illustrated in FIG. 3A.

FIG. 3A is a perspective view of an embodiment of a mover 328 that is usable as part of the fishing lure 214 illustrated in FIG. 2. Additionally, FIG. 3B is an exploded perspective view of a portion of the mover 328 illustrated in FIG. 3A. In particular, FIGS. 3A and 3B illustrates that the mover 328 includes a first mover member 356 that engages and/or interacts with a second mover member 358.

In one representative application of the mover 328, the first mover member 356 can be coupled to the main body section 240 (illustrated in FIG. 2), and the second mover member 358 can be coupled to the tail section 242 (illustrated in FIG. 2) and/or one of the fins 246 (illustrated in FIG. 2). Conversely, in another representative application of the mover 328, the first mover member 356 can be coupled to the tail section 242 and/or one of the fins 246, and the second mover member 358 can be coupled to the main body section 240. During use, as noted above, selective activation of the mover 328 through use of any of the discrete, preset speed settings from the selector assembly 224 (illustrated in FIG. 2) initiates engagement and/or interaction between the first mover member 356 and the second mover member 358, which thus causes the tail section 242 and/or the fins 246 to move relative to the main body section 240. This movement of the tail section 242 and/or the fins 246 relative to the main body section 240 helps to move the fishing lure 214 (illustrated in FIG. 2) through the water 18 (illustrated in FIG. 1) as desired.

The design of the mover 328, and thus the first mover member 356 and the second mover member 358 can be varied. In some embodiments, as shown in FIGS. 3A and 3B, the first mover member 356 includes a first mover body 360 and a first rotating member 362 that is coupled to the first mover body 360. Additionally, the first mover member 356 also includes a first engaging member 364, e.g., a knob, that cantilevers and/or extends away from the first rotating member 362. Further, in some embodiments, the second mover member 358 includes a second mover body 366 and a second engaging member 368, e.g., a slot, that is formed within the second mover body 366.

With this design, when the user 16 (illustrated in FIG. 1) selects any given preset speed setting with the selector assembly 224 (illustrated in FIG. 2), the power source 252 (illustrated in FIG. 2) provides the necessary and desired power to the first mover member 356 to rotate the first rotating member 362 and, thus, the first engaging member 364 relative to the first mover body 360. As the first rotating member 362 rotates, the first engaging member 364 moves generally up-and-down within the second engaging member 368, e.g., within the slot. The rotational movement of the first engaging member 364 further causes the second mover body 366 to move in a generally back-and-forth manner, while also moving up-and-down within the second engaging member 368. Additionally, since in this embodiment the second mover body 366 of the second mover member 358 is coupled to the tail section 242, the tail section 242 is also caused to move back-and-forth relative to the main body section 240. Further, this back-and-forth movement of the tail section 242 relative to the main body section 240 results in the generally forward movement of the lure body 214 within the water 18 relative to the current of the water 18.

As noted above, the design of the mover 328 can be varied from the specific embodiment illustrated herein, so long as the mover 328 moves in such a manner as to cause the tail section 242 and/or the fins 246 to move relative to the main body section 240 for purposes of moving and/or propelling the lure body 220 (illustrated in FIG. 2) through the water 18. As such, the specific design for the mover 328 and/or the mover assembly 226 (illustrated in FIG. 2) illustrated and described herein is not intended to be limiting in any manner.

Embodiments of the present invention are described herein in the context of a fishing lure and a method of manufacturing a fishing lure. Those of ordinary skill in the art will realize that the following detailed description of the present invention is illustrative only and is not intended to be in any way limiting. Other embodiments of the present invention will readily suggest themselves to such skilled persons having the benefit of this disclosure.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

It is understood that although a number of different embodiments of a fishing lure and a method of manufacturing a fishing lure have been described herein, one or more features of any one embodiment can be combined with one or more features of one or more of the other embodiment, provided that such combination satisfies the intent of the present invention.

While a number of exemplary aspects and embodiments of a fishing lure and a method of manufacturing a fishing lure have been shown and disclosed herein above, those of skill in the art will recognize certain modifications, permutations, additions and sub-combinations thereof. It is therefore intended that the system and method shall be interpreted to include all such modifications, permutations, additions and sub-combinations as are within their true spirit and scope, and no limitations are intended to the details of construction or design herein shown.

What is claimed is:

1. A fishing lure for use in water, the fishing lure comprising:
    a lure body;
    a hook that is secured to the lure body;
    a mover assembly that is at least partially positioned within the lure body, the mover assembly including a mover that is configured to move the lure body through the water; and
    a selector assembly that is electrically connected to the mover assembly, the selector assembly being secured to the lure body, the selector assembly including a plurality of preset speed settings that activate the mover assembly to move the lure body through the water, the plurality of preset speed settings including (i) a first preset speed setting for moving the mover at a first preset speed that is greater than zero, and (ii) a second preset speed setting for moving the mover at a second preset speed that is greater than zero and different than the first preset speed, the plurality of preset speed settings being selectively activated non-remotely by directly manipulating the selector assembly.

2. The fishing lure of claim 1 wherein the selector assembly includes a selector member that is coupled to the lure body.

3. The fishing lure of claim 1 wherein the selector assembly includes a first button and a second button that are each coupled to the lure body, wherein depressing the first button activates the first preset speed setting, and wherein depressing the second button activates the second preset speed setting.

4. The fishing lure of claim 1 wherein the selector assembly includes a button that is coupled to the lure body, wherein depressing the button a first time activates the first preset speed setting, and wherein depressing the button a second time activates the second preset speed setting.

5. The fishing lure of claim 1 wherein the selector assembly includes a dial that is coupled to the lure body, and wherein the dial can be turned to discrete positions to selectively activate the first preset speed setting and the second preset speed setting.

6. The fishing lure of claim 1 wherein the selector assembly includes a selector member and a slot, and wherein the selector member can be moved to discrete positions within the slot to selectively activate the first preset speed setting and the second preset speed setting.

7. The fishing lure of claim 1 wherein the selector assembly is voice-activated to selectively activate the first preset speed setting and the second preset speed setting.

8. The fishing lure of claim 1 further comprising a sealable compartment that is positioned substantially within the lure body, wherein the sealable compartment can be selectively filled with a weighting material for selectively adjusting a depth at which the lure body can be positioned within the water.

9. The fishing lure of claim 8 wherein the weighting material is a fluid.

10. The fishing lure of claim 1 wherein the plurality of preset speed settings further includes a third preset speed setting for moving the mover at a third preset speed that is different than the first preset speed and the second preset speed.

11. A method for manufacturing a fishing lure for use in water, the method comprising the steps of:
    securing a hook to a lure body of the fishing lure;
    securing a selector assembly to the lure body;
    positioning a mover assembly at least partially within the lure body, the mover assembly including a mover that is configured to move the lure body through the water; and
    electrically connecting the selector assembly to the mover assembly, the selector assembly including a plurality of preset speed settings that activate the mover assembly to move the lure body through the water, the plurality of preset speed settings including (i) a first preset speed setting for moving the mover at a first preset speed that is greater than zero, and (ii) a second preset speed setting for moving the mover at a second preset speed that is greater than zero and different than the first preset speed, the plurality of preset speed settings being selectively activated non-remotely by directly manipulating the selector assembly.

12. The method of claim 11 further comprising the step of coupling a selector member of the selector assembly to the lure body.

13. The method of claim 11 further comprising the steps of selectively activating the first preset speed setting by depressing a first button of the selector assembly that is coupled to the lure body; and selectively activating the second preset speed setting by depressing a second button of the selector assembly that is coupled to the lure body.

14. The method of claim 11 further comprising the steps of selectively activating the first preset speed setting by depressing a button of the selector assembly that is coupled to the lure body a first time; and selectively activating the second preset speed setting by depressing the button of the selector assembly a second time.

15. The method of claim 11 further comprising the steps of the selectively activating the first preset speed setting by turning a dial of the selector assembly that is coupled to the lure body to a first discrete position; and selectively activating the second preset speed setting by turning the dial of the selector assembly to a second discrete position.

16. The method of claim 11 further comprising the steps of selectively activating the first preset speed setting by moving a selector member of the selector assembly to a first discrete position within a slot; and selectively activating the second preset speed setting by moving the selector member of the selector assembly to a second discrete position within the slot.

17. The method of claim 11 further comprising the steps of forming a sealable compartment substantially within the lure body, and selectively adjusting a depth at which the lure body can be positioned within the water by selectively filling the sealable compartment with a weighting material.

18. The method of claim 17 wherein the step of selectively adjusting includes filling the sealable compartment with a fluid.

19. The method of claim 11 wherein the step of electrically connecting includes the plurality of preset speed settings further including a third preset speed setting for moving the mover at a third preset speed that is different than the first preset speed and the second preset speed.

20. A fishing lure comprising:
a lure body;
a hook that is secured to the lure body;
a sealable compartment that is positioned substantially within the lure body, wherein the sealable compartment can be selectively filled with a weighting material for selectively adjusting a depth at which the lure body can be positioned within the water;
a mover assembly that is at least partially positioned within the lure body, the mover assembly including a mover that is configured to move the lure body through the water; and
a selector assembly that is electrically connected to the mover assembly, the selector assembly being secured to the lure body, the selector assembly including a selector member, the selector assembly including a plurality of preset speed settings that activate the mover assembly to move the lure body through the water, the plurality of preset speed settings including (i) a first preset speed setting for moving the mover at a first preset speed that is greater than zero, (ii) a second preset speed setting for moving the mover at a second preset speed that is greater than zero and different than the first preset speed, and (iii) a third preset speed setting for moving the mover at a third preset speed that is different than the first preset speed and the second preset speed, the plurality of preset speed settings being selectively activated non-remotely by directly manipulating the selector assembly.

* * * * *